A. R. Reese.

Seeding-Machine.

No 2864 Reissued Feb. 11, 1868.

Witnesses.
Robert H. Smith
Alex Mahon

Inventor
Adam R. Reese
by his atty
A. M. Smith

UNITED STATES PATENT OFFICE.

ADAM R. REESE, OF PHILLIPSBURG, NEW JERSEY, ASSIGNEE OF GEORGE W. LEE AND ADAM R. REESE.

IMPROVEMENT IN SEEDING-MACHINES.

Specification forming part of Letters Patent No. 31,123, dated January 15, 1861; Reissue No. 2,864, dated February 11, 1868.

*To all whom it may concern:*

Be it known that GEORGE W. LEE, formerly of Phillipsburg, Warren county, New Jersey, but now of Winchester, Columbiana county, Ohio, and ADAM R. REESE, of Phillipsburg, Warren county, State of New Jersey, did invent certain new and useful Improvements in Grain-Drills or Seeding-Machines, of which the following is a full, clear, and exact description, reference being had to the accompanying drawings, in which—

Figure 1:
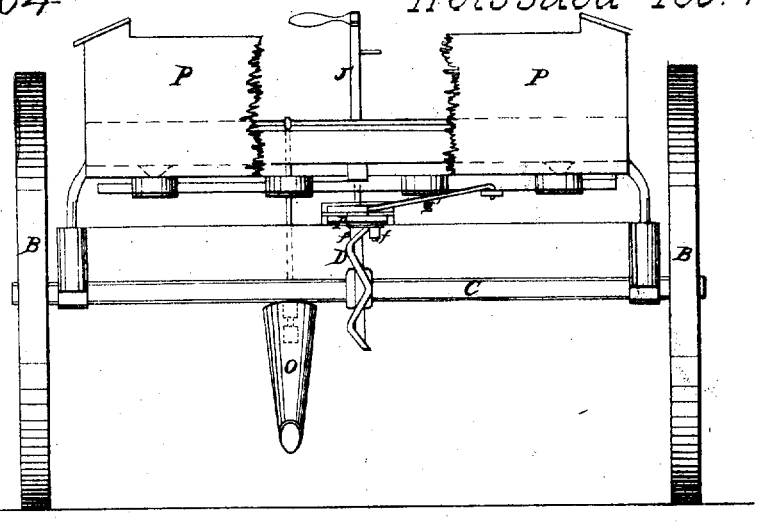
Figure 2:
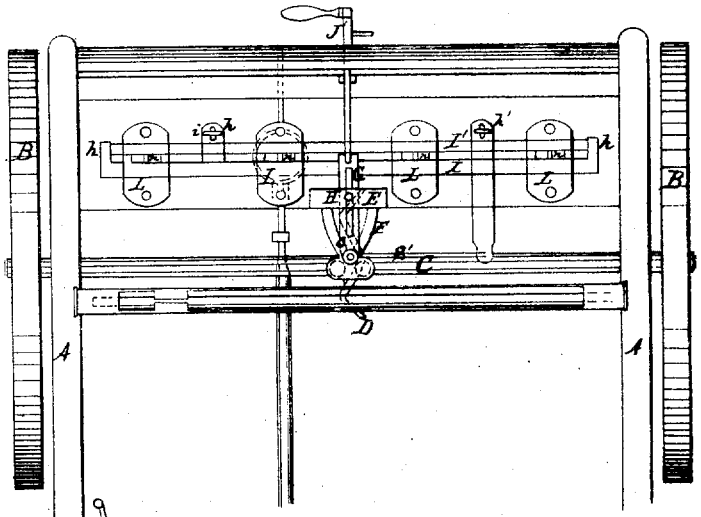
Figure 3:
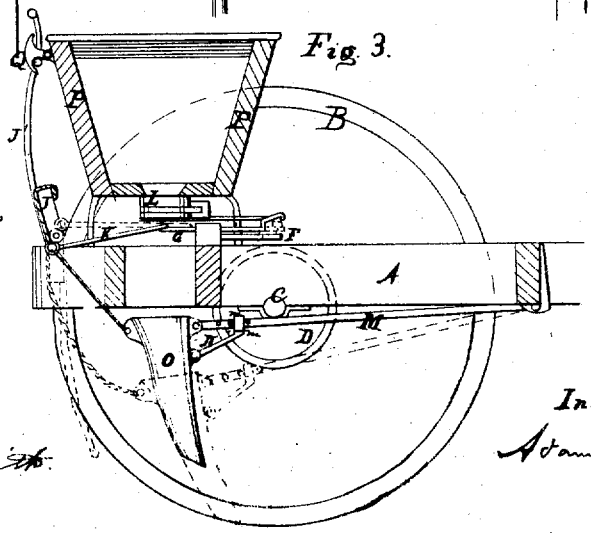
Figure 4:
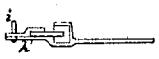
Figure 5:
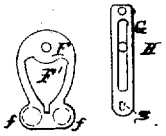

Figure 1 is a rear elevation of a machine embracing said improvements, a portion of the grain box or hopper being broken away, the more clearly to show the arrangement of parts, &c. Fig. 2 is a plan or top view with the hopper removed. Fig. 3 is a longitudinal section; and Figs. 4 and 5 represent parts of the machine detached and hereinafter referred to.

The invention relates to the combination of the grain-discharging mechanism with the lifting-lever or means for raising the seed-tubes out of the ground in such manner that the operation of said lever for the purpose of raising the tubes is made to arrest the discharge or delivery of the grain; also, to the manner of bracing the seed-tubes, whereby they are sustained in a proper working position during the operation of the machine, but are released and allowed to turn back out of the way in the event of their striking an obstruction, as hereinafter explained.

In the accompanying drawings similar letters of reference wherever used denote the same parts.

A represents the main frame; B B, the carrying and driving wheels, mounted on the shaft or axle C.

D is the wave or cam wheel, also mounted on and turning with the shaft C.

E is a box or bearing secured to one of the transverse bars of the frame A, in which is mounted the skeleton plate or lever F, and the slotted slide-lever G, said lever and slide being retained in the box by a pin or bolt, H, passing through them. The lever or plate F has two studs or pins, *f f*, provided with friction-rollers secured to it, embracing the wave-wheel D, by the rotation of which with the axle in the forward motion of the machine a vibratory motion is imparted to the lever F upon its pin or pivot H. At the front of lever F or of the opening F′ formed therein a notch or slot is cut in the lever for the reception of a stud on the slotted slide-lever G (shown in dotted lines at *g*, Fig. 5) when the machine is in operation, thereby imparting a vibratory motion to said slide. The slide G is connected to the sliding feed-bar I I′ by means of connecting-rod *g′* in such manner as to impart a reciprocating movement thereto when the slotted lever G is vibrated.

J is the back-roller or lifting-board, connected to the seed-tubes and operated by means of lever J′, for raising the seed-tubes from or dropping them down upon the ground.

K is a connecting-rod or pitman, attaching the lifting board or lever to the slide-lever G, as shown in Fig. 3 of the drawings.

The feed-slide is composed of two plates or bars, placed parallel with each other, the one, I, working or sliding in recesses in the grain-stirrups L, the other, I′, supported in arms *h h′*, attached to plate I, two of which arms, *h h′*, are provided with set-screws *i*, passing through slots formed therein into corresponding arms attached to bar I′ in such manner as to provide for the adjustment of the bar I′ nearer to or farther from the bar I, for the purpose of regulating the quantity of seed-discharge from the hopper or grain-box.

*n n* are pins or teeth formed on one of the bars or plates I′, which fit into corresponding recesses or sockets formed in the bar I. These pins cross the discharge-openings in the bottom of the hopper, and, being moved back and forth from side to side of the grain-plates or stirrups by the reciprocation of the slide, effect a steady and constant discharge of the grain without danger of bruising it or of the clogging of the machine. By a suitable arrangement of hose or pipe the seed is conveyed to the seed-tubes and thence to the bottom of the furrow formed thereby.

M is a draw-bar pivoted at its upper or forward end to frame A, and having the seed-tube pivoted through lugs or ears formed thereon to its rear or lower end in the manner shown by the drawings.

N is a brace connected at its rear or lower end to lugs or ears formed upon or attached to the seed-tube O by a metal pivot, and provided at its forward or upper end with a loop, *m*, which embraces the draw-bar M, and is free to slide back and forth thereon. The draw-bar is provided with any suitable number of perforations, in any one of which a slight wooden pin, *q*, is inserted behind the loop *m* to regulate the angle of presentation of the seed-tube to the ground, and in such manner as to prevent its backward deflection during the ordinary operation of the machine; but in the event of the tooth or tube striking a large stone or other obstruction, which cannot be turned aside by the tooth, the wooden pin, which holds the loop and sustains the tube in proper working position, will break and allow the loop to slide back upon the bar, thus allowing the necessary deflection of the tooth to enable it to pass the obstruction without endangering its being broken.

P is the grain box or hopper, and Q is a latch secured to said hopper for holding the lever when the tubes are raised and the machine is thrown out of action.

From the foregoing description of the construction and arrangement of parts it will be seen that when the lifting board or lever which raises the seed-tubes out of the ground is operated it acts through the connecting-rod *g'* upon the slide-lever and draws the stud or pin formed thereon out of the notch in the skeleton-lever, when said slide-lever ceases to vibrate, and consequently the operation of the feed-slide, which is connected thereto, is immediately suspended. The motion of the lever in taking up the slack in the lifting-cord or in slightly raising the tube will be sufficient to disconnect the vibrating levers and stop the movement of the feed-slide before the tubes are out of the ground. When the tubes are again dropped into the ground the reverse movement of the lever again forces the notch on the slide-lever into the notch in the skeleton-lever, and the operation of the feed-slide is resumed. When it is desired to increase or diminish the amount of seed passing from the hopper the bars are adjusted farther from or nearer to each other by means of the slotted arms and set-screws, as described, the discharge-pins on the one bar sliding freely in the sockets or recesses formed in the other bar, and maintaining the parallel relation of said bars to each other, while increasing or diminishing the size of the opening between them in which the grain is received, and from which it is discharged on the opposite sides of the stirrups L in the manner explained.

What is claimed herein and sought to be secured by Letters Patent as the invention of the said GEORGE W. LEE and ADAM R. REESE, is—

1. The lifter-handle that raises the seed-tubes out of the ground, in combination with a mechanism or device that throws the feed out of gear before the seed-tubes are out of the ground by the one movement of said lifter-handle.

2. In combination with a grain-drill tube and draw-bar, a brace to support the tube fastened at its lower end to the tube, and at its upper end embracing the draw-bar, and a wooden pin which holds the upper end in proper position, and which will allow the brace to slide back on the bar when the tube strikes an obstruction, for the purpose set forth.

3. The feed-slide of a grain-drill made of two bars, the one sliding in recesses of the grain-stirrups, while the other is adjustable in relation thereto in such manner as to maintain the parallelism of said bars, for the purpose set forth.

ADAM R. REESE.

Witnesses:
JOS. KING ARNDT,
CHAS. SITGREAVES, Jr.